United States Patent Office 2,749,228
Patented June 5, 1956

2,749,228

DEFOLIATION

Waldo B. Ligett, Pontiac, and Calvin N. Wolf, Ferndale, Mich., assignors to Ethyl Corporation, New York, N. Y., a corporation of Delaware No Drawing. Application October 20, 1951, Serial No. 252,409

5 Claims. (Cl. 71—2.3)

This invention relates to the defoliation of crops, to the preparation of agricultural plants for harvesting, and to forced maturing. This invention also relates to control of economic pests by altering the life-cycle of botanical hosts.

It has been recognized for many years that in order to reap the optimum crop from a large variety of plants, in particular those plants of luxuriant growth yielding a crop which is field-harvested, it is desirable to alter the growth of those non-harvestable, functional organs of the plant in order to render accessible, or hasten the maturity of, the harvestable portions.

It is well known that during the normal life process of a herbaceous plant, the leafy portions drop as a result of changes in a group of specialized cells at the base of the petiole. The outward effect is the result of development of an abscission layer composed of meristematic cells developed across the base of the petiole. The mechanism of these changes is essentially little understood, but a number of external, naturally occurring factors are known to produce this inner growth effect. For example, in certain species, a decrease in ambient temperature at the proper period in the life cycle of the plant causes the natural formation of the abscission layer. Likewise, an injury, through disease or adverse growing conditions, will be conducive to such abscission layer, resulting in the sloughing-off by the plant of the injured member. A number of additional causes of natural origin, or abnormally imposed by nature on the plant, bring about defoliation.

None of the above methods of defoliation are available as means for controlling defoliation at will. A few attempts have been recorded to bring about such defoliation at the desired period in the life cycle of the plant. Such prior methods have been inadquate in that injury to the plant and a consequent decrease in crop yield results, defoliation is incomplete, secondary effects of an undesirable nature are produced, or the applied materials are non-adherent or removed by weathering, resulting in the necessity for repeated and costly applications, or must be applied during a limited and critical period during the growing season.

The present invention has for an object the provision of formulations and methods effective in causing defoliation. A further object of our invention is the provision of materials and methods for preparing agricultural crops for the harvest. A further object is to control pest infestation by altering the life-cycle of hosts for such agricultural pests. Likewise, it is an object of our invention to provide compositions which enhance the value of agricultural crops, hasten the maturity thereof, and permit optimum harvest to be obtained. Still further objects will be apparent from the further description of our invention hereinafter.

The defoliation and the resulting improvement in crop value and indirect control of pest infestation is achieved by employing defoliant compositions containing certain members of the class of thioamides in combination with surface contacting agents directly to the foliage of the plant. In general the active defoliant ingredients of our compositions comprise N-aryl-thioamides. One of our preferred defoliants comprises a formulation of thioacetanilide with a surface contacting agent. However, we have found that by certain modifications of the thioacetanilide structure we can obtain the advantages of our invention and in certain applications such modifications are preferred. In general the thioamides which we incorporate in our defoliant compositions comprise compounds of the formula $RCSNR_1Ar$, wherein R is an aliphatic radical, Ar is an aryl radical and $R_1$ is a hydrogen, aryl or alkyl radical.

Among the R groups which we can incorporate in the active defoliant ingredient of our novel composition we include methyl, ethyl, propyl, butyl, amyl, hexyl, and up to about eighteen carbon atom straight chain radicals. In addition such aliphatic radicals can be substituted on the chain with aromatic hydrocarbon groups such as phenyl, naphthyl, anthracyl, phenanthryl, and the like. Thus illustrative examples of such R groups can be benzyl, β-phenethyl, and anthracyl methyl groups. Furthermore, in those embodiments of the active defoliants wherein the R group contains three or more carbon atoms such radicals can be branched chain aliphatic radicals such as, for example, isopropyl, sec.-butyl, 2-methylhexyl and the like. As the group Ar in the above formula in the active defoliant ingredient of our novel composition we can employ such aromatic groups as for example phenyl, α- and β-naphthyl, phenanthryl and anthracyl radicals, the latter two being attached to the nitrogen atom at any of the available positions of the aromatic group, and hydrocarbon substituted aryl groups as above. Among such embodiments of the group Ar we include tolyl, xylyl, ethylphenyl, methylnaphthyl and propylnaphthyl groups and the like. In those embodiments of the active defoliants of our invention wherein the group $R_1$ is not hydrogen it can be any aliphatic or aryl radical as illustrated above. Specific examples illustrative of the thioamide defoliant ingredient in our novel compositions include N-phenyl-thioacetamide (or thioacetanilide), N - phenyl - thiopropionamide, N - propyl - thioacetanilide, N - phenyl - n - thiobutyramide, N - phenyl - iso - thiobutyramide, N - (α - naphthyl) - thioacetamide, N - (β - naphthyl) - thioacetamide, N - (α -naphthyl) - N - methyl - thioacetamide, N - (p - tolyl) - thioacetamide, N - (o - tolyl) - N - methyl - n - thiovaleramide, N - phenyl - thiostearamide, N - (α(Ar.) - tetrahydronaphthyl- thioacetamide, N - (2,3 - dimethylphenyl) - thioacetamide and the like.

One of the advantages of the defoliant compositions of our invention resides in the fact that the conditions existing at the time of or after application are of secondary significance. For example, various inorganic or water soluble defoliant compositions have been suggested. Among these are water soluble fluorides, chlorates and hypochlorites, sulfamic acid derivatives, cyanamides and chlorinated phenols and salts thereof. In order to obtain any degree of defoliation with the above-mentioned defoliants it is ordinarily desirable to apply them under such atmospheric conditions that surface moisture is deposited on the leaf to aid in intimate contacting of the active ingredient with the leaf surface. Obviously the limits of humidity within which such compositions are effective is narrow and excessive moisture would cause the materials to be washed off the plant surface before effective defoliation could occur. Such dependence on nature's whims seriously limits the applicability of the practice of defoliation, as the important variable to consider is the state of growth of the plant. The materials comprising the defoliants of our invention withstand the weathering effects of moisture and furthermore possess the advantage that they can be applied either to the dry leaf surface or to a leaf surface which has already been moistened by rain or dew. In either event effective defoliation will take place and our method is largely independent of ambient atmospheric conditions.

Many of the materials which have been suggested previously as defoliants suffer the serious disadvantage that they must be applied at a particular period in the life cycle of the plant. Thus, for example, certain defoliants which have been previously suggested, in particular the chlorinated phenol type must be applied just before the crop has been made in the case of cotton defoliation. Other defoliants, in particular the inorganic type must be applied during a period when the plant has reached maturity. For example, in the case of cotton defoliation, at such period when the bolls are essentially completely developed. Thus it is common practice to attempt defoliation with such materials during the traditional harvest period, that is in the relatively dry months of the year. Because of the requirements of humidity it is usually necessary in such cases to introduce a humectant such as calcium chloride, magnesium chloride or other hygroscopic agent along with the defoliant ingredient. Inclusion of such materials complicates the application, causing injury to the plant and in general reducing the desirability of employing such defoliant compositions. We have found that our materials are capable of effecting defoliation at any period during the life cycle of the plant wherein true leafs have been produced. Thus our materials are effective in defoliating a wide variety of agricultural crops. For example, when applied to tomato plants we have been able to achieve defoliation during the active growing season when the vegetation is lush and therefore promote early and uniform ripening of the fruits and also thereby controlling insect pests by eliminating the leafy portions of the plant upon which they feed during this growing period. Likewise in applications on cotton plants we have achieved complete defoliation in young plants, not more than 6 or 7 inches high. The implications of such activity with regard to boll weevil control opens up a novel approach to this serious problem. In such instances we have observed that the plant is not killed by the application of the defoliants, and, in fact, after the leaves have dropped off the plant, within a short period of time a new and vigorous growth of leaves has been resumed. In defoliating the leguminous plants such as soy bean, it is possible to bring about defoliation at any desired stage in the development of the bean. Thus if it is desired to harvest mechanically the green edible bean or the dried bean, the defoliant composition of our invention can be applied at the appropriate period with equally effective results. Observation of the operation of our defoliant ingredients indicates that a true hormone type action is involved, and our defoliants operate not by causing withering, desiccation or injury of any type to the leaf but rather by a true translocation within the plant system. Apparently the defoliation caused by the materials of our invention resembles closely the defoliation brought about by natural circumstances occurring in the life cycle of the plant as evidenced by the regrowth of true leaves which we have observed after defoliation in the presence of our materials. An advantage of this type of defoliation and which we achieve to a marked degree with our defoliant compositions is a further independence of the atmospheric conditions pertaining at the time of defoliation. Many defoliants previously described require mechanical removal of the leaves after the damage or withering brought about by the applied agent. Frequently it is hoped that this can be brought about by movement of the leaves caused by wind or it is necessary to go through the field being treated and actually knock off the withered leaves mechanically. We have observed that after application of the defoliants of our invention there is first a bending of the leaf petiole at the abscission layer followed by a natural dropping from the stem. Depending upon the type of plant, the maturity at application, and the seasonal conditions the leaves will either remain green and succulent before dropping or will achieve a condition similar to that existing just prior to natural defoliation.

In order to obtain practical benefit from the inherent defoniant activity of our thioamides we employ them in conjunction with surface contacting agents. One purpose of the surface contacting agent is apparently to provide a medium by which the active ingredient is placed in proper contact with the leaf surface and can be absorbed thereby into the plant system and by translocation locate at the cite where abscission occurs. Another purpose of a surface contacting agent is to permit the application of our materials in a uniform manner on the leaf surfaces and in the appropriate minute quantities required, that is in those proportions required by the characteristics of the plant and the seasonal requirements.

Although the agricultural crops to which our defoliants can be profitably applied exist in a normally aqueous environment we have discovered surprisingly that one very effective method of applying our defoliants is in the form of organic or oily solution, suspensions, or emulsions. One particular advantage of this type of surface contacting formulation is that even under extreme conditions of high humidity or rainfall the defoliant materials adhere tenaciously to the leaf surface. By such methods we achieve intimate contact with the leaf surface, rapid absorption by the leaf and translocation of the active ingredient to the particular specialized plant cells which by subsequent abscission cause defoliation. Further, if applied during a period of dry weather, rainfall immediately following the application will have little or no effect upon the composition and the defoliation process will proceed as if there were no such interference by atmospheric conditions. A further advantage of applying defoliants in the form of oil suspensions or solutions is that under conditions where winds of high or moderate velocity would tend to cause a drift towards other crop areas which it is not desired to defoliate, such formulations can be controlled to a greater extent than can dust formulations or even aqueous formulations. Further because of the greater adherence of this type of formulation, the amount of material being applied can be controlled at an amount nearer the optimum required for defoliation without allowing an inordinate excess to take care of run-off. However, the nature of our materials is such that even when applied in aqueous surface contacting formulations the above advantages are still obtained in contrast to the inorganic or highly water soluble defoliants which have previously been suggested. For certain plants, sensitive to oils, this method of application is then preferred.

Where the conditions under which application is being made permit the use of dust formulations we have found that our defoliants can be employed in this form with effective results. We have found that certain solid carriers perform the function of providing a surface contacting agent in certain applications equally effectively as the above-mentioned oily or aqueous formulations. A further advantage of employing our defoliants in dust formulations resides in the organic nature of the defoliant, that is, here again our materials are not dependent upon the fortuitous deposition of the proper amount of moisture in the form of dew as has been the experience in attempting defoliation with dry formulations of previously suggested defoliants. Furthermore, excessive moisture or rainfall immediately following application of our dry formulations does not seriously hinder the subsequent action of our defoliant ingredients.

One method of applying our defoliants is in the form of an oil solution wherein our materials are dissolved in a hydrocarbon oil as typified by kerosene, T-942-B oil, Enjay oil and certain non-herbicidal petroleum oils, in particular those of medium weight or viscosity, in concentrations between the limits of about 0.5 and 5.0 weight per cent. In the above formulations we believe the oil itself to be the surface contacting agent, an effect which is brought about by the peculiar nature of the upper leaf surface wherein a waxy cuticle exists permitting the initial contact between the defoliant and the actual leaf surface in the presence of the oil to be achieved. The following example illustrates one method of preparing such a defoliant composition.

Example I

To 100 parts of Enjay oil was added finely ground thioacetanilide in the amount of 5 parts. This 5 per cent mixture of active ingredient was agitated until solution occurred. A composition suitable for application was made from this concentrate by further diluting with the oil to a final concentration of 0.5 weight per cent.

Equally good oil formulations of N-phenyl-thiopropionamide, N-phenyl-iso-thiobutyramide, N-(β-naphthyl)-thioacetamide, N-(p-tolyl)-thioacetamide and N-(o-tolyl)-N-methyl-n-thiovaleramide were prepared by the above method.

For certain applications defoliant compositions of our invention are preferably employed in the form of surface contacting suspensions. In general we prepare such suspensions by one of the following methods: A concentrated oil solution of the active ingredient is prepared and this is added to water containing a dispersing agent; a solution of one of our defoliants in a water soluble solvent is prepared which is thereupon added to water containing a dispersing agent or a water suspension of the defoliant is prepared and added to an oil in the presence of a dispersing agent. Thus we can prepare either a water and oil emulsion or a solid dispersion of the active ingredient. Examples of typical dispersing agents which can be employed in forming dispersions include salts of the alkyl and alkylaryl sulfonates, such as du Pont MP–189 and Nacconol–NR, alkyl sulfates, such as Dreft, alkylamide sulfonates, such as Igepon–T, the alkylaryl polyether alcohols, such as Triton X–100, the fatty acid esters of polyhydric alcohols, such as Span, the ethylene oxide addition products of such esters, as for example Tween, and the addition products of long-chain mercaptans and ethylene oxide, such as Sharples' Non-Ionic–218. Still other surface-active agents can be employed, for example that referred to Emulfor Ag Oil Soluble, the above merely showing a representative list of the more common materials.

The following examples typify methods of preparing the above formulations.

Example II

A formulation of N-phenyl-thiopropionamide was prepared by finely grinding 10 parts of this material with 90 parts of water containing 0.1 part of Tween–80. Ten parts of this aqueous suspension was thereupon added to 200 parts of T–942-B to form a final formulation consisting of 0.5 weight per cent of N-phenyl-thiopropionamide in an oil-in-water emulsion containing a surface active agent.

Equally good formulations of N-phenyl-thioacetamide, N - phenyl - n - thiobutyramide, N - (α - naphthyl)-thioacetamide, N - (α - naphthyl) - N - methyl - thioacetamide, N - (o - tolyl) - N - methyl - n - thiovaleramide and N - (α (ar.) - tetrahydronaphthyl - thioacetamide are prepared by this method.

Example III

Following the procedure of Example II, N-phenyl-thioacetamide was dissolved in carbitol to the extent of 10 weight per cent. This solution was added with agitation to water containing 1 weight per cent Tween–80 to provide a one per cent concentration of N-phenyl-thioacetamide in suspension in 10 weight per cent carbitol-in-water.

Similarly formulations of N-phenyl-thiopropionamide, N - phenyl - iso - thiobutyramide, N - (β - naphthyl)-thioacetamide, N - (p - tolyl) - thioacetamide, N - phenyl-thiostearamide and N - (2,3 - dimethylphenyl) - thioacetamide are readily prepared by this method.

Example IV

A similar formulation of N-phenyl-n-butyramide was prepared according to the procedure of Example II wherein Enjay oil was substituted for the carbitol. Such oil-in-water suspensions of N-phenyl-thioacetamide, N-(α-naphthyl) - thioacetamide, N - (p - tolyl) - thioacetamide, N - (α (ar.) - tetrahydronaphthyl - thioacetamide, N-phenyl - n - thiobutyramide and N - phenyl - thiopropionamide are so prepared with equally good results.

Example V

A 10 per cent solution of N-(α-naphthyl)-thioacetamide was prepared in methyl alcohol and the resulting solution was added to 100 parts of water containing 1 part of Nacconol–NR to provide an aqueous suspension comprising 1 per cent of the active ingredient in an alcohol-water mixture.

In a similar manner we prepare such suspensions of N - phenyl - thioacetamide, N - propyl - thioacetanilide, N - (α - naphthyl) - N - methyl - thioacetamide, N-phenyl - n - thiobutyramide, N - (o - tolyl) - N - methyl-n - thiovaleramide and N - (α (ar.) - tetrahydronaphthyl - thioacetamide in ethanol, methanol, propanol, isopropanol, acetone, and methyl isobutyl ketone, with equal effectiveness.

Example VI

One part of N-phenyl-thiostearamide was agitated with 10 parts of T–942-B oil and the resulting solution was added to 190 parts of T–942-B oil containing 0.5 part of Emulfor Ag oil soluble.

Similar 0.5 per cent suspensions of N-phenyl-thioacetamide, N-propyl-thioacetanilide, N-(α-naphthyl)-thioacetamide, N-(α-naphthyl)-N-methyl-thioacetamide, N-(p-tolyl)-thioacetamide, N-(2,3-dimethylphenyl)-thioacetamide and N-(o-tolyl)-N-methyl-n-thiovaleramide were prepared with like results by the method of Example VI.

Example VII

One part of thioacetanilide ground to pass a 50-mesh screen was treated in a ball mill with 100 parts of fuller's earth. This one per cent by weight solution was directly suitable for use.

Similar dust formulations of compounds N-phenyl-iso-thiobutyramide, N-(β-naphthyl)-thioacetamide, N-(p-tolyl)-thioacetamide, N-phenyl-n-thiobutyramide, N-(o-tolyl)-N-methyl-n-thiovaleramide and N-(α(ar.)-tetrahydronaphthyl-thioacetamide are prepared equally effectively in fuller's earth as well as such other solid carriers as bentonite, pyrophyllite, Attaclay, talc and powdered chalk. These and similar carriers are also equally effective in preparing dust formulations of the thioacetanilide of Example VII.

Example VIII

A mixture of 50 parts of N-(α-naphthyl)-N-methyl-thioacetamide, 100 parts of bentonite and 0.5 part of Tween–80 were treated in a ball mill for a period of one-half hour. At the end of this period the mixture was screened to pass a 100-mesh sieve. This 50 weight per cent wettable powder formulation was further treated to form a suspension suitable for application by adding with agitation 100 parts of the wettable powder to 1,000 parts of water. The resulting aqueous suspension of the solid surface contacting agent and defoliant is suitable for spraying directly upon crops.

Other carriers which have been employed in preparing wettable powders of our defoliants include bentonite, pyropyhllite, Attaclay, talc and powdered chalk. Other dispersants can be employed in preparing these wettable powders, for example, Igepon-T, Nacconol-NR, Tween-80, Dreft and the like.

To demonstrate the effectiveness of the defoliation of growing plants by employing the defoliant compositions of our invention we sprayed soy bean plants to run-off with a composition consisting of 0.5 per cent N-phenyl-thioacetamide in a 10 percent mixture of T-942-B oil-in-water. Within a period of 5 days complete defoliation of the sprayed plants had occurred. A similar formulation when sprayed on cotton plants at a concentration of one per cent active ingredient along with the same surface contacting agent, complete defoliation occurred, that is, all the leaves dropped from the plants without mechanical help.

Employing the carbitol formulation of N-phenyl-thioacetamide of Example III at a one per cent concentration of the active defoliant, 75 per cent defoliation of the soy bean plant and 84 per cent defoliation of the cotton plant was achieved, when applied to the plants until run-off occurred. When this suspension was sprayed at a much lower level, that is when only three milliliters were sprayed on the individual cotton plant, 50 per cent defoliation occurred within a period of 7 days. Similarly when 20 milliliters of the formulation of Example III was sprayed on each of soy bean and cotton plants, 100 per cent defoliation occurred on the former and 70 per cent on the latter.

Employing the oil-in-water emulsion containing the Emulfor Ag oil soluble dispersant of Example I, 100 per cent defoliation of cotton was achieved by spraying 20 milliliters per plant and 100 percent defoliation of soy bean when the mixture was applied to run-off.

Equally good results are obtained when such typical defoliant ingredients of our invention as N-propyl-thiopropionamide, N-($\alpha$-naphthyl)-thioacetamide, N-(p-toyl)-thioacetamide, N-phenyl-thiostearamide, N-($\alpha$(ar.)-tetrahydronaphthyl-thioacetamide and N-(2,3-dimethylphenyl)-thioacetamide are employed in the formulations as described in the foregoing examples.

In general the defoliant ingredients of our formulations can be prepared by treating the corresponding N-arylamides with phosphorus pentasulfide. For example when acetanilide itself is treated with phosphorus pentasulfide, the thioacetanilide defoliant of our invention is prepared. Similarly when each of N-($\alpha$-naphthyl)-N-methyl-acetamide, N-phenyl-iso-butyramide, N-(o-tolyl)-N-methyl-n-valeramide, N-propyl-acetanilide, N-phenyl-stearamide, N-(p-tolyl)-acetamide and N-(2,3-dimethylphenyl)-acetamide for example are treated with phosphorus pentasulfide, the corresponding thioamide, N-($\alpha$-naphthyl)-N-methyl-thioacetamide, N-phenyl-iso-thiobutyramide, N-(o-tolyl)-N-methyl-n-thiovaleramide, N-propyl-thioacetanilide, N-phenyl-thiostearamide, N-(p-tolyl)-thioacetamide and N-(2,3-dimethylphenyl)-thioacetamide result.

For certain applications, particularly when our defoliants are applied to plants during the active growing season, and regrowth of new leaves might occur and be undesirable, it is possible to employ along with our defoliants any of several agents designed to stunt the growth of the plant. A typical example of such materials is maleic hydrazide. In addition to maleic hydrazide it is sometimes desirable to employ a material such as sucrose to enhance the ability to prevent regrowth of the leafy structures of the plants. Furthermore, although one of the advantages of our materials resides in the ability to withstand weathering to a remarkable degree, an adherent agent can be employed along with our defoliants if this is desired without interfering with the activity thereof. Likewise under extreme conditions of drought or where plants have been grown under unusually arid conditions, it is possible to employ humectants along with our defoliants particularly when dry or dust formulations are employed.

A number of methods are available for applying the defoliants of our invention. For limited application to small fields or where close control of the application is required to prevent defoliating neighboring tracts, power driven spray or dusting equipment is satisfactory. In some instances it is preferred to employ hand operated spray equipment. A particularly effective method of applying our defoliants is by aircraft spraying wherein large areas can be rapidly and economically treated. Our materials are particularly advantageous in this method of application in that the oil formulations illustrated above can be employed to advantage in that good adherence and little drifting is encountered Thus one of the major drawbacks to the commercial utilization of previously suggested defoliants has been overcome by this embodiment of our invention.

The quantity of active ingredient present in our surface contacting defoliant composition is not critical. At extremely high concentrations, of the order of about 50 per cent by weight, some phytotoxicity is observed and reduced effectiveness in defoliation. Therefore, we prefer to employ our defoliant ingredient in amount between about 0.1 and 5 per cent by weight. The amount of defoliant formulation applied to a crop depends, of course, on a number of variables. For example, the greater the number of leaves and leaf surfaces exposed per acre, the greater the amount of defoliant required. Similarly the species or genus of plant defoliated will be a determining factor. Furthermore, the period in the growing season as well as the conditions under which the plants are grown is important. Thus, tough leaves grown in arid climates generally require more defoliant than lush, new growths.

Having thus described a number of typical embodiments of the defoliant and pest control compositions of our invention and typical methods for their application as well as typical plants for which they are effective, we do not intend that our invention be limited except as in the appended claims.

We claim:

1. A composition effective in defoliating agricultural crops consisting of at least 0.1 part by weight of an N-arylthioamide and up to 100 parts of a hydrocarbon oil and a surface active agent, suitable for use in water and oil emulsion, the concentration of N-arylthioamide being sufficient to cause defoliation.

2. A defoliant composition consisting essentially of a hydrocarbon oil dispersion containing a surface active agent and a defoliating concentration of a thioamide of the formula $RCSNR_1Ar$, wherein R is an alkyl group, Ar is an aromatic hydrocarbon radical, and $R_1$ is selected from the group consisting of hydrogen, an alkyl group, and an aromatic hydrocarbon radical, said thioamide being present in said hydrocarbon oil dispersion in a concentration of at least 0.1 weight per cent.

3. A process which comprises defoliating living agricultural crops by applying to the foliage thereof and at a time wherein true leaves are produced a defoliant composition consisting essentially of a hydrocarbon oil dispersion containing a surface active agent and a defoliating quantity of a thioamide of the formula $RCSNR_1Ar$ wherein R is an alkyl group, Ar is an aromatic hydrocarbon radical, and $R_1$ is selected from the group consisting of hydrogen, an alkyl group, and an aromatic hydrocarbon radical, said thioamide present in said hydrocarbon oil dispersion in a concentration of at least 0.1 weight per cent.

4. A composition effective in defoliating agricultural crops consisting essentially of an aqueous dispersion of the composition of claim 1 wherein said N-arylthioamide is present in an amount between about 0.1 and 5.0 weight per cent, said amount being sufficient to cause defoliation.

5. The composition of claim 4 in which the N-arylthioamide is thioacetanilide.

References Cited in the file of this patent

UNITED STATES PATENTS

| | | |
|---|---|---|
| 2,280,756 | Saukaitis | Apr. 21, 1942 |
| 2,412,510 | Jones | Dec. 10, 1946 |
| 2,556,665 | Smith | June 12, 1951 |

OTHER REFERENCES

J. Economic Entomology, vol. 42 (1949, pp. 839 and 840.

Journal of Economic Entomology, vol. 41 (1948), pp. 31 to 36.